United States Patent Office 3,419,801
Patented Dec. 31, 1968

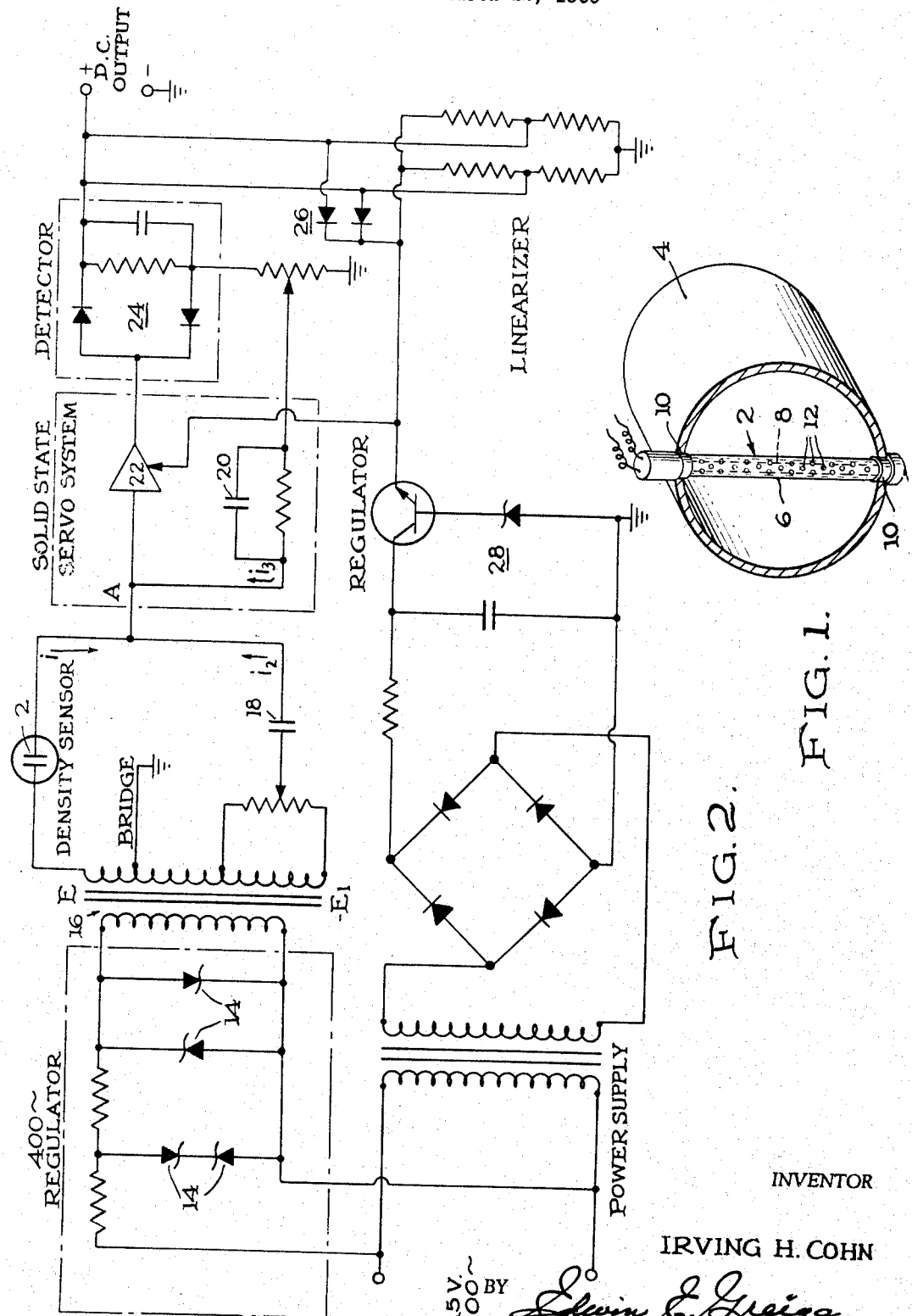

3,419,801
CAPACITANCE-TYPE MEASURING APPARATUS FOR FLUIDS IN A SUPER-CRITICAL STATE INCLUDING A DIODE LINEARIZATION NETWORK
Irving H. Cohn, New York, N.Y., assignor to Simmonds Precision Products, Inc., Tarrytown, N.Y., a corporation of New York
Filed Mar. 12, 1965, Ser. No. 439,253
3 Claims. (Cl. 324—61)

ABSTRACT OF THE DISCLOSURE

A capacitance-type measuring apparatus for fluids in a supercritical state which provides a signal proportional to the density of the fluid wherein an all-electronic signal condition converts the capacitance from a measuring transducer, which is a function of fluid density according to the Clausius-Mossotti relationship, into a D.C. signal output linearly proportional to the fluid mass. The equation is instrumented by means of a diode linearization network couped to a detector circuit which rectifies the output of a bridge summing circuit to provide a D.C. signal for telemetering and indicator operation.

---

This invention relates to the measurement of density of supercritical hydrogen and oxygen and, more particularly, to a novel signal conditioner which provides a telemetering signal proportional to density.

Hydrogen and oxygen for power generation in conjunction with fuel cells can be stored in pressure vessels in supercritical state. Since there is no liquid floating about in a zero G environment, problems of gaging and expulsion are considerably simplified. The supercritical state is one in which the stored material is above its critical temperature and pressure. In this condition the fluid is liquid-like in that it is of relatively high density. It fills the container and homogeneity may be maintained by means of mechanical agitation. Since the volume of the container is well known, a measurement of fluid density is all that is required for a determination of mass. In order to measure density of the stored fluid, a theoretical relationship between dielectric constant and density must be found. This relationship is given by the Clausius-Mossotti (C-M) equation:

(1) $$\frac{K-1}{K+2}=PD$$

where:
$K$=the dielectric constant
$D$=the density
$P$=the specific polarization Accordingly, the object of the present invention is to provide an instrumentation system for the measurement of density of supercritical hydrogen and oxygen.

It is another object of the present invention to provide a system consisting of capacitance probes and a novel electronic signal conditioner which provides a telemetering signal proportional to density.

It is yet another object of the present invention to provide an all solid state electronic system made up of ultra high reliable components packaged in high density, low weight fashion for spacecraft use.

According to one embodiment of the present invention, the densities of supercritical hydrogen and oxygen are gaged by capacitance sensors, concentric aluminum tubes, which are mounted across the diameter of a spherical or cylindrical tank. The capacitance of the sensors is a function of fluid density as shown in the Clausius-Mossotti (C-M) relationship. An all electronic signal conditioner converts the capacitance into a D.C. signal output linearly proportional to the fluid mass. Corrections for the non-linearity of the C-M equation and for the effects of temperature on the sensors are made by means of diode networks.

A better understanding of the invention will be had after reading the following detailed description with reference to the appended drawings, in which:

FIG. 1 is a perspective view of the capacitance sensor shown mounted in a fluid tank; and FIG. 2 is a schematic illustration of the solid state signal conditioner utilized in the present invention.

Referring to FIG. 1, there is shown a capacitive sensing element 2 mounted across the diameter of the tank 4. The sensor 2 consists of two concentric aluminum cylinders 6, 8 mounted on a Teflon insulator 10. Small Teflon spacers between the tubes maintain concentricity. Holes 12 are provided in the outer conductor to allow free movement of the cryogenic liquid during the filling process. After the tank has been filled with liquid (indicated by the capacitance gage), it is sealed and brought above the critical pressure by the introduction of heat. Constant pressure is maintained during expulsion by means of a pressure switch (not shown) until the liquid is well into the supercritical state to prevent the formation of a two-phase condition. The last portion of the expulsion cycle may be accomplished at constant temperature.

The equation for the capacitance of a pair of concentric cylinders is:

(2) $$C=\frac{2\pi e_o LK}{\log b/a}$$

where:
$e_o$=permittivity of free space
$L$=the cylinder length
$K$=the dielectric constant of the fluid
$b/a$=the diameter ratio On substituting the solved C-M equation for $K$, the above expression becomes:

(3) $$C=\frac{2\pi e_o L(2PD+1)}{(1-PD)\log b/a}$$

The effect of temperature variation on each aluminum cylinder is to change its length and its diameter. It can be shown that diametric expansion of a pair of concentric cylinders does not affect the ratio of diameters ($b/a$), so that a change of length only must be considered. The length of a tube may be expressed as:

(4) $$L=L_o(1+\alpha t)$$

$L_o$=the initial length
$\alpha$=the temperature coefficient of expansion
$t$=the temperature difference Combining Equations 3 and 4

(5) $$C=\frac{2\pi e_o L_o(1+\alpha t)(2PD+1)}{(1-PD)\log b/a}$$

This is the equation that must be instrumented.

In previous systems of this sort a mechanically rebalanced servo driven capacitance bridge was used. It was found on the onset that the required reliability could not be obtained by this method. An analysis showed that the motor, gear train and rebalance potentiometer used in this system would compromise the reliability considerably. The all solid state electronic system of the present invention was designed to overcome this compromise.

The solid state capacitance-type servo system is shown as part of the signal conditioner schematically illustrated in FIG. 2. The input is regulated by a series of Zener diodes 14 which tightly clip the 400 cycle input. The regulated square waves are used to power the bridge transformer 16 producing alternating voltages of opposite polarities at power line frequency in the secondary. These alternating voltages E and —E are applied to the tank sensor 2 and a reference capacitor 18. The currents $I_1$ and $I_2$ in these capacitors are summed with a feedback current $I_3$ in feedback capacitor 20. With sufficient gain in feedback, the junction of these currents is at a null and their sum is nearly zero. The amplifier 22 provides an alternating output proportional to input capacitance. The detector circuit 24 rectifies this output so as to provide the required 0–5 v. D.C. for telemetering and indicator operation. The D-C voltage is applied to a diode linearization network 26 which is powered by a regulated power supply 28 and designed to match the curve represented in Equation 5. Adjusting potentiometers are provided for setting in the offset and range corresponding to the empty and full capacitance of the system.

The instrumentation system can be packaged in modular form utilizing ultra high reliability components. Calculations show that a mean time between failure of $2.7 \times 10^6$ hrs. can be realized for such a system. This represents a reliability of 0.99988 for 336 hrs. Capacitance measurement accuracies exceeding ±0.5% of full scale are obtained, including the linearization networks.

Certain conditions are necessary to satisfy the relationship between dielectric constant and density. Thus, when an electric field is imposed on a dielectric, the molecular charges (positive in the nucleus and negative in the electron ring surrounding the nucleus) are displaced from their normal condition. The molecules are described as polar or non-polar depending on whether the "centers of gravity" of the protons and electrons do or do not coincide in their normal state. In the non-polar molecules in which the centers of gravity do coincide, the result of applying an electric field is elastic deformation of the charge configuration. This is the first of four conditions necessary to satisfy the C-M equation. A second necessary condition is the absence of short range interaction between molecules, a condition which exists if the distance between molecules is sufficiently large. A third condition is isotropy of the polarizability of the molecules which exists in spherical molecules only. The fourth is isotropy or cubic symmetry in molecular arrangements which occur in gases.

It has been found that P varies over 0.15% for $O_2$ over a range of densities of 1000 to 1. Using an average value of P for gaseous $H_2$, a density value of $75 \times 10^{-5}$ lbs. per gallon at 32 F and 1 atm. was substituted in Equation 1 and a dielectric constant of 1.000273 was calculated. This compares closely with the value of 1.000264 for normal pressure and temperature. At the other end of the density range using 0.636 lbs. per gallon for liquid $H_2$ at 14 K, a value of dielectric constant of 1.2510 was found. This compares with a reported value of 1.2480.

The C-M equation for hydrogen, therefore, becomes:

(7) $$D = 1.0 \frac{K-1}{K+2}$$

At low densities the relationship may be approximated by straight line equation. Equations of the above form may be found for materials other than hydrogen in which specific polarization remains relatively constant over the range of interest. Since the graph of the C-M equation is a straight line at low densities, and acquires a slight curvature at higher densities, a linearizing circuit has been provided as shown in FIG. 2 and described above for correcting this curvature within the control unit associated with the liquid to be gaged.

It is interesting to note that while Equation 5 contains a temperature term to include thermal expansion of the aluminum, it is not necessary to provide a temperature signal for density determination. The method of expulsion (constant pressure) provides a known temperature from given charts for each density. This is programmed into the linearization networks 26 in the signal conditioner. In any event this correction is a second order effect since the coefficient of aluminum is small at the operating temperatures.

In addition to the density sensing system a temperature sensing system may be included as a backup in the same envelope. A platinum resistance element is mounted near the top of the density sensor 2. This element senses the temperature of the supercritical fluid.

The capacitance method of mass gaging of supercritical fluids provides a simple, easily instrumented device for the designer of zero gravity tankage systems. Capacitance measurement is directly related to mass and independent of pressure and temperature. A simple electronic device is thus available for the direct conversion to low impedance high level D.C. telemetering signals. The system is capable of accuracies of ±0.5% or better with accuracies improving at the lower densities. The sensing element is designed to fit across the diameter of the tank so that it may also be used in normal gravity conditions for loading measurements of the cryogenic liquid. Special calibration charts may be supplied to compensate for the tank shape.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

I claim:

1. In a capacitance type measuring apparatus for a fluid in a supercritical state providing a signal proportional to the density of the fluid when the relationship between the dielectric constant (K) and the density (D) of the fluid is given by the equation $$\frac{K-1}{K+2} = PD$$

where P is the specific polarization, comprising in combination, a measuring condenser immersible in the fluid, a first circuit connecting said condenser for producing a first component of current therein, a second circuit having a reference signal means for providing a second component of current, a power supply having a first regulated square wave output coupling said first and second circuits, a third circuit including signal responsive means for producing a third feedback component of current, a junction connecting said circuits where the sum of said currents is nearly zero, a diode linearization network coupled to said third circuit and said power supply having a second regulated output coupled to said linearization circuit, whereby the capacitance of said measuring condenser in said first circuit is converted to an output signal in said third circuit linearly proportional to the density of said fluid.

2. A device according to claim 1, further having a circular-shaped tank wherein said measuring condenser comprises concentric tube electrodes mounted across the diameter of said tank.

3. Capacitance type measuring apparatus for a fluid in a supercritical state providing a signal proportional to the density of the fluid when the relationship between the dielectric contact (K) and the density (D) of the fluid is given by the equation $$\frac{K-1}{K+1} = PD$$

where P is the specific polarization, comprising in combination, a measuring condenser having spaced concentric electrodes immersible in the fluid and constructed and arranged such that its capacitance is proportional to the fluid density as a function of said equation, a first circuit connecting said condenser for producing a first component of current therein, a second circuit having reference signal means for producing a second component of current, a power supply having a first regulated square wave output coupling said first and second circuits, a third circuit having signal responsive means for producing a feedback current therein, a diode linearization circuit coupled to said third circuit, a junction for said circuits where the sum of said currents is nearly zero, a detector circuit for rectifying the output signal of said third circuit, means coupling said rectified output to said linearization network and said power supply having a second regulated output coupled to said linearization circuit whereby the capacitance of said measuring condenser is converted to an output signal linearly proportional to the density of said fluid.

References Cited

UNITED STATES PATENTS

| | | | |
|---|---|---|---|
| 2,932,970 | 4/1960 | Zito | 73—304 |
| 3,119,267 | 1/1964 | Bartky | 324—61 X |
| 3,176,222 | 3/1965 | Atkinsson | 324—61 |
| 3,244,977 | 4/1966 | Folsom | 314—119 X |
| 3,247,387 | 4/1966 | Doubek et al. | 250—210 |

RUDOLPH V. ROLINEC, *Primary Examiner.*

E. E. KUBASIEWICZ, *Assistant Examiner.*

U.S. Cl. X.R.

73—309